United States Patent
Chen et al.

(10) Patent No.: US 11,609,444 B2
(45) Date of Patent: Mar. 21, 2023

(54) SYSTEM AND METHOD FOR MEASURING A MOTION PICTURE RESPONSE TIME OF A LIQUID CRYSTAL DISPLAY

(71) Applicant: Realtek Semiconductor Corp., HsinChu (TW)

(72) Inventors: Yung-Chih Chen, HsinChu (TW); Wei-Chih Lin, HsinChu (TW); Jui-Te Wei, HsinChu (TW); Po-An Chen, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 56 days.

(21) Appl. No.: 17/191,735

(22) Filed: Mar. 4, 2021

(65) Prior Publication Data
US 2021/0278711 A1    Sep. 9, 2021

(30) Foreign Application Priority Data
Mar. 9, 2020  (TW) ................. 109107680

(51) Int. Cl.
*G02F 1/13*    (2006.01)
*G02F 1/00*    (2006.01)
(Continued)

(52) U.S. Cl.
CPC .......... *G02F 1/1309* (2013.01); *G02F 1/0063* (2013.01); *G02F 1/136254* (2021.01);
(Continued)

(58) Field of Classification Search
CPC ............. G02F 1/1309; G02F 1/136254; G02F 1/0063; G09G 3/006; G09G 3/36; G09G 2320/0252
See application file for complete search history.

(56) References Cited

U.S. PATENT DOCUMENTS

2006/0160436 A1   7/2006  Oka
2007/0080915 A1*  4/2007  Nomizo ............... G09G 3/3648
                                                        345/89
(Continued)

FOREIGN PATENT DOCUMENTS

KR    20070078912 A  *  8/2007

OTHER PUBLICATIONS

Chan, "LCD Motion Blur: Modeling, Analysis, and Algorithm", IEEE Transactions on Image Processing, vol. 20, No. 8, Aug. 2011.
(Continued)

*Primary Examiner* — Chanh D Nguyen
*Assistant Examiner* — Ngan T. Pham-Lu
(74) *Attorney, Agent, or Firm* — Winston Hsu

(57) ABSTRACT

A measurement system for measuring a motion picture response time (MPRT) of a liquid crystal display (LCD) has a computer and a measurement device. The computer controls a display panel of the LCD to switch between a plurality of different gray levels. The measurement device measures variations of brightness of the display panel when the display panel switches its gray level. The computer obtains at least a gray level response time (GLRT) normalized curve according to results of measuring the variations of the brightness. The computer integrates the at least a GLRT normalized curve to obtain at least an MPRT normalized curve, obtains at least a time interval of the at least an MPRT normalized curve, and calculates an average of the at least a time interval to obtain the MPRT of the LCD.

16 Claims, 10 Drawing Sheets

(51) Int. Cl.
  *G02F 1/1362* (2006.01)
  *G09G 3/00* (2006.01)
  *G09G 3/36* (2006.01)

(52) U.S. Cl.
  CPC ............... *G09G 3/006* (2013.01); *G09G 3/36* (2013.01); *G09G 2320/0252* (2013.01)

(56) References Cited

U.S. PATENT DOCUMENTS

2007/0126678 A1\* 6/2007 Shih ................ G09G 3/342
  345/89
2009/0122087 A1\* 5/2009 Maruyama ........... G09G 3/3611
  345/102

OTHER PUBLICATIONS

Video Electronics Standards Association (VESA), VESA FPDM Standard 2.0 Update File, Section 309, May 19, 2005.
Blankenbach, "Measurement Devices," Handbook of Visual Display Technology, pp. 1-17, May 2015.
Watson, "Comparison of motion blur measurement methods," SID 2009, Nov. 13, 2008.

\* cited by examiner

SYSTEM AND METHOD FOR MEASURING A MOTION PICTURE RESPONSE TIME OF A LIQUID CRYSTAL DISPLAY

BACKGROUND OF THE INVENTION

1. Field of the Invention

The present invention relates to a system and method for measuring a motion picture response time (MPRT) of a liquid crystal display (LCD), in particular to a system and a method for measuring the MPRT of the LCD by measuring at least a gray level response time (GLRT) of the LCD.

2. Description of the Prior Art

Motion pictures displayed on a liquid crystal display (LCD) and observed by the human eye are usually blurred, which cause dynamic blur. The reason is because the LCD is a hold type display, and the position of the target object in the motion pictures is changed to make people feel the moving effect of the object. Because motion pictures are composed of multiple static pictures, the human eye will easily perceive the persistence of vision when the frame rate of the motion pictures is too low. In order to be able to specifically express the degree of motion blur of the motion pictures, a quantized numerical value called motion picture response time (MPRT) is proposed.

Currently, there are two prior art methods for measuring the MPRT. One is to use a mobile camera to capture variations in the motion pictures. This method assumes that the human eye can move at the same speed as the object on the display. The object is moving at a constant speed on the display while the camera moves at a constant speed to capture the moving object. Then, the brightness variations received by the camera are used to determine a blur width, and the MPRT is further calculated accordingly. Another way to measure the MPRT is to use a high-speed camera to capture the variations of the motion pictures, and then use spatial integration to obtain the MPRT. Regardless of the methods of the prior art, in addition to the expensive cost of the measurement instrument itself, it must also overcome a speed error of the moving object or a focus distance error during high-speed capture, so the measurement results obtained by different measurement instruments may be very different.

SUMMARY OF THE INVENTION

An embodiment provides a method for measuring a motion picture response time (MPRT) of a liquid crystal display (LCD). The method comprises controlling a display panel of the LCD to switch between a plurality of different gray levels; measuring variations of brightness of the display panel while switching the display panel between the gray levels to obtain at least a gray level response time (GLRT) normalized curve; integrating the at least a GLRT normalized curve to obtain at least an MPRT normalized curve; obtaining at least a time interval of the at least an MPRT normalized curve; and calculating an average of the at least a time interval to obtain the MPRT of the LCD.

Another embodiment provides a measurement system for measuring a motion picture response time (MPRT) of a liquid crystal display (LCD). The measurement system comprises a computer and a measurement device. The computer controls a display panel of the LCD to switch between a plurality of different gray levels. The measurement device measures variations of brightness of the display panel when the display panel is switched between the gray levels. The measurement device transmits results of measuring the variations of the brightness of the display panel to the computer, and the computer obtains at least a gray level response time (GLRT) normalized curve according to the results. The computer integrates the at least a GLRT normalized curve to obtain at least an MPRT normalized curve, obtains at least a time interval of the at least an MPRT normalized curve, and calculates an average of the at least a time interval to obtain the MPRT of the LCD.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
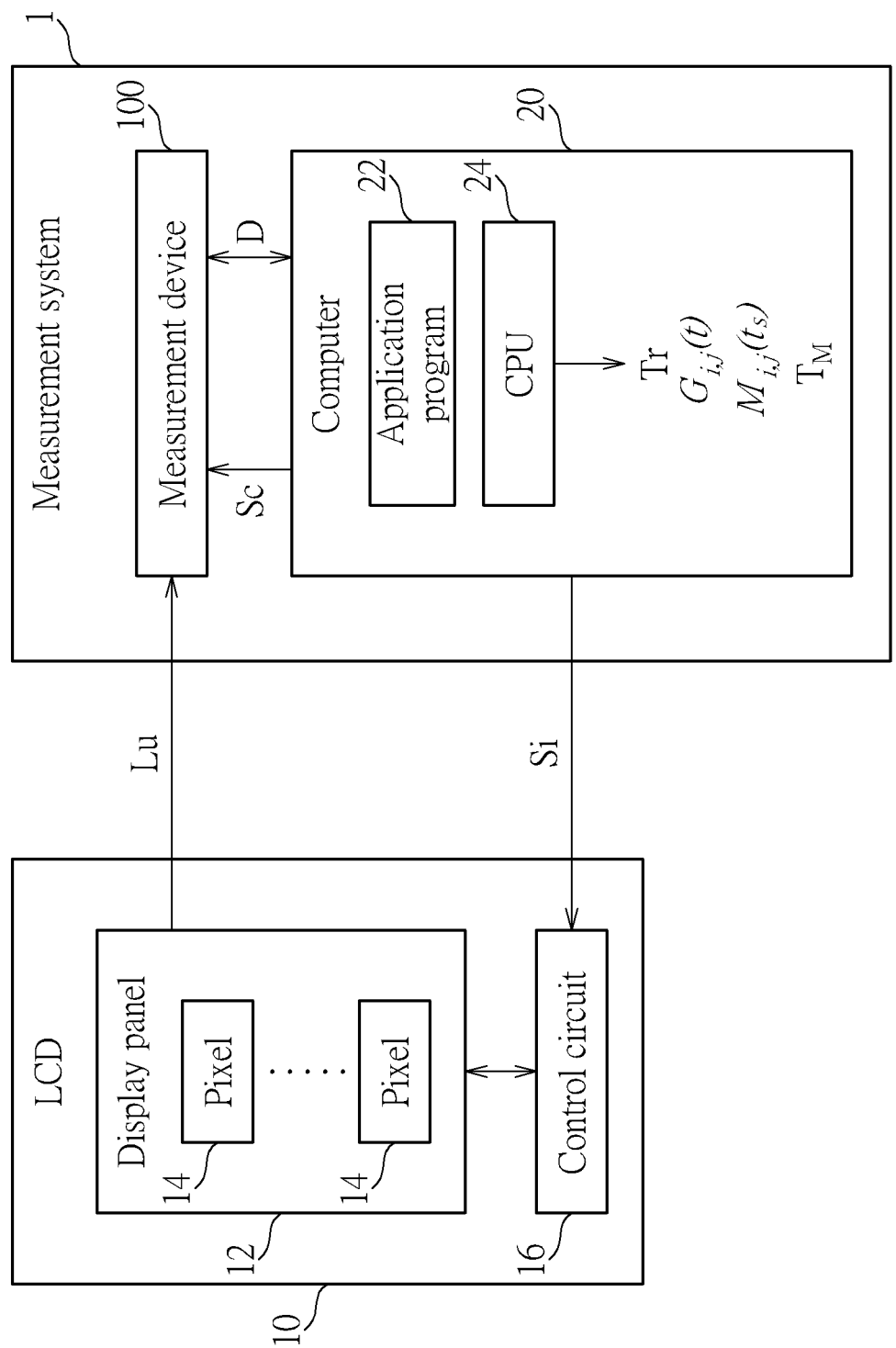
FIG. 1 is a functional block diagram of a measurement system and a liquid crystal display (LCD) to be tested according to an embodiment of the invention.
Figure 2:
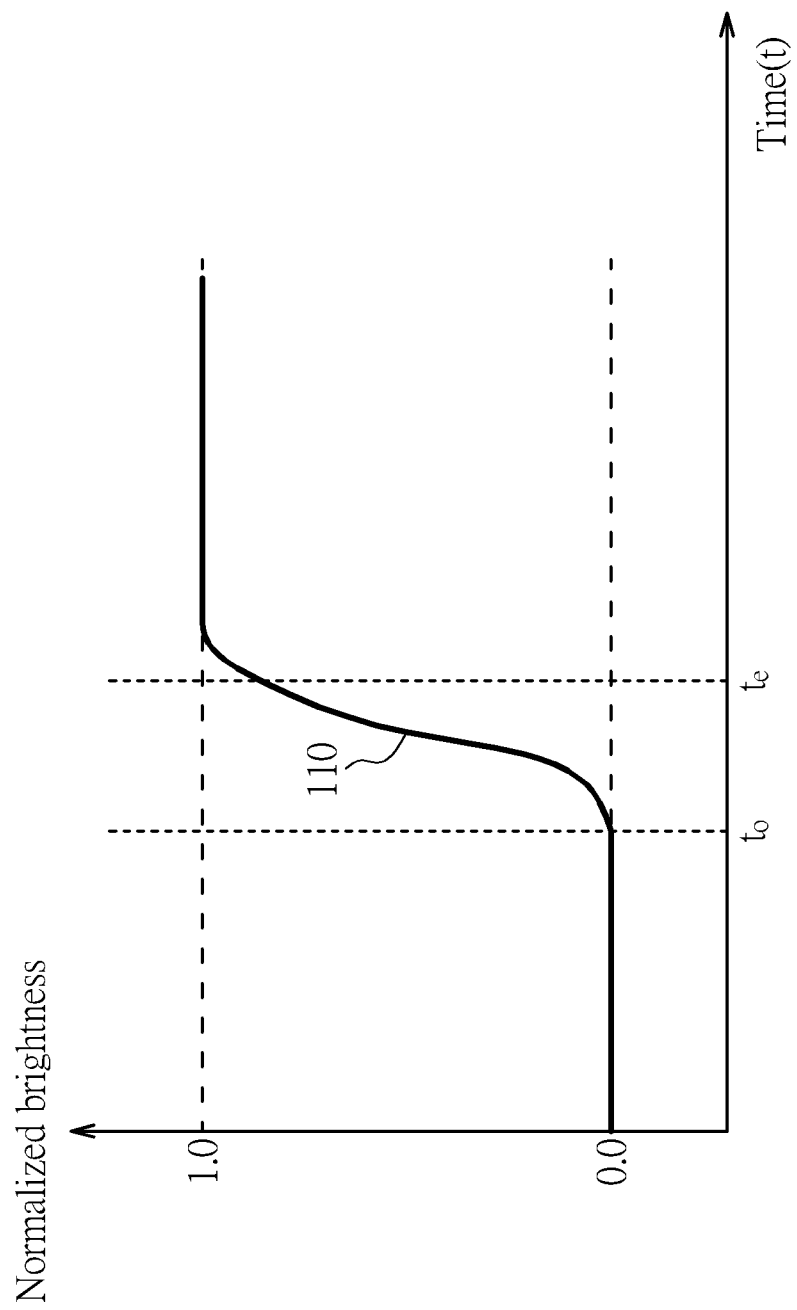
FIG. 2 shows one of the gray level response time (GLRT) normalized curves of the LCD in FIG. 1.

FIG. 1 is a functional block diagram of a measurement system 1 according to an embodiment of the invention and a liquid crystal display (LCD) 10 to be tested. The measurement system 1 comprises a measurement device 100 and a computer 20. The measurement device 100 and the computer 20 are coupled to the LCD 10, and the measurement device 100 is further coupled to the computer 20. The measurement device 100 may comprise a photosensitive element (for example, a photosensitive coupling element), an analog-to-digital converter, and other elements for measuring the variations of the brightness of the LCD 10. The LCD 10 comprises a control circuit 16 and a display panel 12. The control circuit 16 receives a display signal Si from the computer 20 to control a plurality of pixels 14 of the display panel 12 to display a corresponding image according to the received display signal Si, and the liquid crystals in the display panel 12 will be controlled to process transition (i.e., polarity inversion) when the display panel 12 displays different images to prevent the liquid crystals from gradually losing their optical rotations due to polarization. When the liquid crystals of the display panel 12 process polarity inversions, the brightness Lu of the display panel 12 will change. Therefore, by measuring the variations of the brightness Lu, the response time of the LCD 10 (i.e., the time required for the transition of the liquid crystals) would be obtained. Further, in the embodiment, when the response time Tr of the LCD 10 is to be measured, a plurality of pixels 14 of the display panel 12 will be controlled to display the same gray level, so that the display panel 12 displays a single-color image. Then, the gray level of the pixels 14 of the display panel 12 will be switched from i to j, where i is not equal to j. When switching the gray level of the pixels 14 of the display panel 12, the measurement device 100 measures the variations of the brightness Lu of the LCD 10, then converts the measured brightness Lu into a digital signal D, and transmits the digital signal D to the computer 20, so that an application program 22 executed by a central processing unit (CPU) 24 of the computer 20 would calculate the response time Tr of the LCD 10 according to the received digital signal D, and obtain a gray level response time (GLRT) normalized curve $G_{i,j}(t)$, as shown in FIG. 2. The parameter t represents time, the parameter i represents the gray level of the pixels 14 before switching, and the parameter j represents the gray level of the pixels 14 after switching.

When the measurement is started, the computer 20 will send a signal to notify the measurement device 100 to start the measurement, and at the same time, the computer 20 would transmit the display signal Si to the display panel 12 to control the pixels 14 to switch their gray levels (i.e., the liquid crystals in the display panel 12 are controlled to process polarity inversion). The communication between the measurement device 100 and the computer 20 can be bidirectional or unidirectional, depending on the transmission interface chosen by the user. After the measurement device 100 receives the signal Sc from the computer 20 to start measuring, the measurement device 100 starts to measure the brightness Lu and sends the digital signal D to the computer 20. The termination of the measurement can be actively initiated by the computer 20 to notify the measurement device 100 to stop the measurement. For example, when the computer 20 receives a sufficient amount of data of the digital signal D, it will actively notify the measurement device 100 to terminate the measurement. In addition, the measurement may also be terminated when the measurement device 100 finds that the images of the display panel 12 have no longer changed, and then the measurement device 100 actively notifies the computer 20 to terminate the measurement.

The application program 22 executed by the CPU 24 of the computer 20 would calculate the GLRT normalized curve 110 (i.e., $G_{i,j}(t)$) as shown in FIG. 2 according to the received digital signal D. The GLRT normalized curve 110 is used to represent the relationship between the brightness Lu of the display panel 12 and the time t when the gray level of the pixels 14 of the display panel 12 are switched from i to j. The time point $t_o$ in FIG. 2 is the time point at which the pixels 14 start to switch the gray level, and the time point $t_e$ is the time point at which the pixels 14 stop switching the gray level. It is worth noting that the brightness on the vertical axis in FIG. 2 is the brightness obtained after normalization. In the embodiment, since the gray level i is less than j, the brightness of the display panel 12 after switching the gray level will be greater than the brightness before switching the gray level. Therefore, the normalized brightness of the display panel 12 before switching the gray level (i.e., when the gray level is equal to i) will be equal to 0, and the normalized brightness of the display panel 12 after switching the gray level (i.e., when the gray level value is equal to j) will be equal to 1. The above description is for explaining the case where the gray level i is less than j. As for the case where the gray level i is greater than j, it will be further explained in the subsequent description.

The computer 20 controls the pixels 14 of the display panel 12 to switch between different gray levels, and measures the brightness Lu of the display panel 12 to obtain a plurality of GLRT normalized curves $G_{i,j}(t)$ of the display panel 12. In an embodiment of the present invention, the selected gray levels range from the darkest of 0 to the brightest of 255, and the computer 20 would control the pixels 14 to switch between seven different gray levels. The seven gray levels may be 0, 60, 90, 120, 160, 200 and 255. In other words, the parameters i and j are selected from the group consisting of seven gray levels of 0, 60, 90, 120, 160, 200 and 255. Since i is not equal to j, the combination of i and j of each GLRT normalized curve will be different from the combination of i and j of other GLRT normalized curves. In this case, 42 (i.e., 7×6) GLRT normalized curves $G_{i,j}(t)$ would be obtained, such as $G_{0,60}(t)$, $G_{0,90}(t)$, $G_{0,120}(t)$, $G_{0,160}(t)$, $G_{0,200}(t)$, $G_{0,255}(t)$, $G_{60,0}(t)$, $G_{60,90}(t)$, $G_{60,120}(t)$, $G_{60,160}(t)$, $G_{60,200}(t)$, $G_{60,255}(t)$, $G_{255,0}(t)$ $G_{255,60}(t)$, $G_{255,90}(t)$, $G_{255,120}(t)$, $G_{255,160}(t)$, and $G_{255,200}(t)$. For example, $G_{60,0}(t)$ represents the GLRT normalized curve obtained when the gray level of the pixels 14 is switched from 0 to 60; $G_{0,90}(t)$ represents the GLRT normalized curve obtained when the gray level of the pixels 14 is switched from 0 to 90; $G_{255,90}(t)$ represents the GLRT normalized curve obtained when the gray level of the pixels 14 is switched from 255 to 90, and so on.

In addition, the application program 22 executed by the CPU 24 would integrate the plurality of GLRT normalized curves $G_{i,j}(t)$ to simulate and obtain a plurality of MPRT normalized curves $M_{i,j}(t_s)$. Each of the MPRT normalized curves MA) could be expressed as the following equation (1):

$$M_{i,j}(t_s) = \int_{t_s}^{t_s+T_f} G_{i,j}(t)dt \tag{1}$$

Where $t_s$ is time, and $T_f$ is a frame period of the LCD 10. The frame period $T_f$ is equal to the reciprocal of the refresh rate of the display panel 12. Therefore, by changing the refresh rate of the display panel 12, the frame period $T_f$ would be changed accordingly. Therefore, the computer 20 may calculate the frame period $T_f$ according to the refresh rate of the display panel 12.

Figure 3:
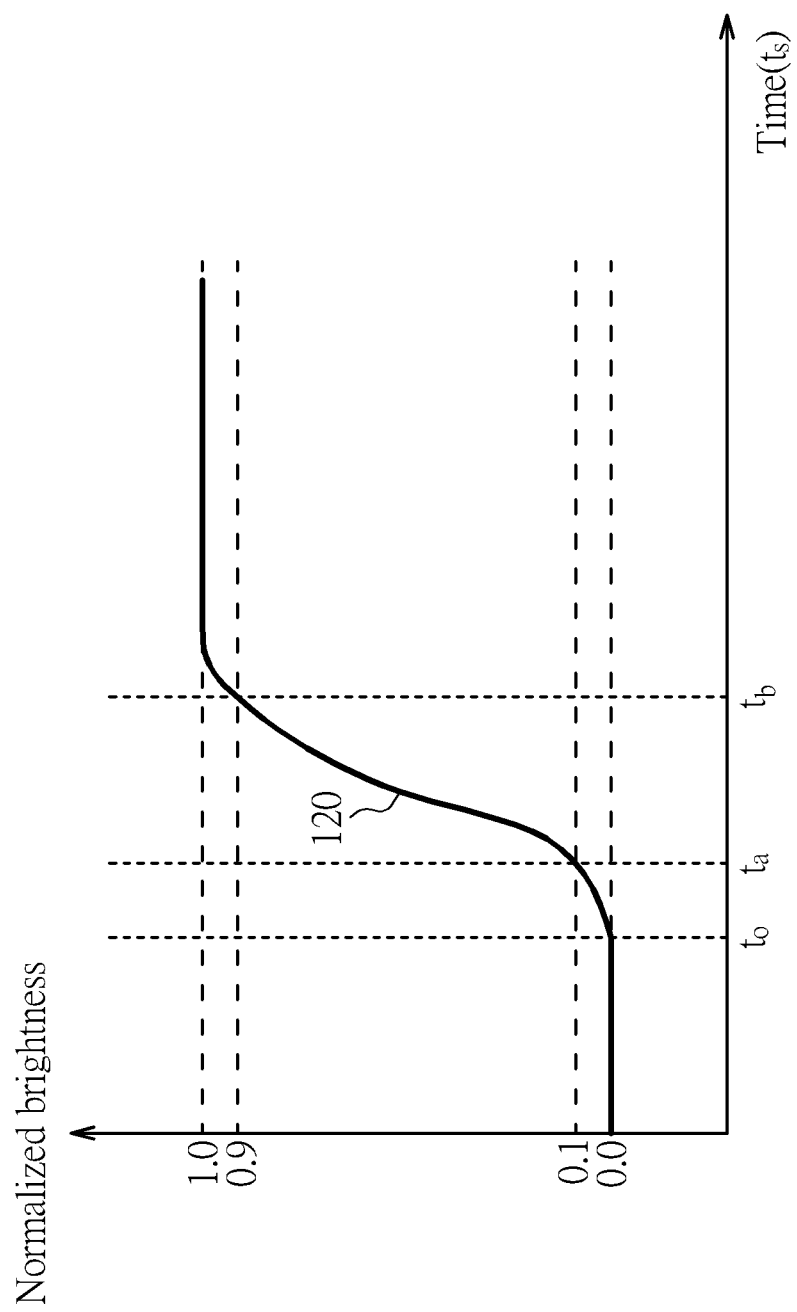
FIG. 3 shows a motion picture response time (MPRT) normalized curve corresponding to the GLRT normalized curve in FIG. 2.

According to equation (1), the MPRT normalized curve $M_{i,j}(t_s)$ obtained by integrating the GLRT normalized curve 110 in FIG. 2 is the MPRT normalized curve 120 shown in FIG. 3. It is worth noting that the brightness on the vertical axis in FIG. 3 is the brightness obtained after normalization. In addition, the time point $t_o$ in FIG. 3 is the time point $t_o$ in FIG. 2 at which the pixels 14 start to switch the gray level.

In the above embodiments, the computer 20 controls the pixels 14 to switch between seven different gray levels, and the application program 22 executed by the CPU 24 integrates the 42 GLRT normalized curves $G_{i,j}(t)$ to obtain the 42 MPRT normalized curves $M_{i,j}(t_s)$. In the case where i and j are selected from the group consisting of seven gray levels of 0, 60, 90, 120, 160, 200 and 255, the 42 MPRT normalized curves $M_{i,j}(t_s)$ are $M_{0,60}(t_s)$, $M_{0,90}(t)$, $M_{0,120}(t_s)$, $M_{0,160}(t_s)$, $M_{0,200}(t_9)$, $M_{0,255}(t_s)$, $M_{60,0}(t_s)$, $M_{60,90}(t_s)$, $M_{60,120}(t_s)$, $M_{60,160}(t_s)$, $M_{60,200}(t_s)$, $M_{60,255}(t_s)$, . . . , $M_{255,0}(t_s)$, $M_{255,60}(t_s)$, $M_{255,90}(t_s)$, $M_{255,120}(t_s)$, $M_{255,160}(t_s)$, $M_{255,200}(t_s)$. For example, $M_{0,60}(t_s)$ represents the MPRT normalized curve obtained when the gray level of the pixels 14 is switched from 0 to 60; $M_{0,90}(t_s)$ represents the MPRT normalized curve obtained when the gray level of the pixels 14 is switched from 0 to 90; $M_{255,90}(t_s)$ represents the MPRT normalized curve obtained when the gray level of the pixels 14 is switched from 255 to 90, and so on.

In addition, the application program 22 executed by the CPU 24 would obtains a time interval of each MPRT normalized curve $M_{i,j}(t_s)$. Taking FIG. 3 as an example, the time interval between the time points $t_a$ and $t_b$ is the time interval $(t_b-t_a)$ of the MPRT normalized curve 120 to be obtained by the application 22. For different MPRT normalized curves $M_{i,j}*t_s)$, the corresponding time points $t_a$ may be different, and/or the corresponding time points $t_b$ may be different. In the embodiment, $M_{i,j}(t_a)$ is equal to 0.1, and $M_{i,j}(t_b)$ is equal to 0.9. In addition, the application 22 would calculate the average of all time intervals to obtain the MPRT of the LCD 10. Assuming that the MPRT of the LCD 10 is $T_M$, and the time interval $(t_b-t_a)$ of the MPRT normalized curve $M_{i,j}(t_s)$ is equal to $T_{i,j}$, then the MPRT $T_M$ of the LCD 10 could be obtained by the following equation (2):

$$T_M = \frac{\sum T_{i,j}}{N} \tag{2}$$

$$T_{i,j} = (t_b - t_a) \tag{3}$$

Where N is a total number of the MPRT normalized curves $M_{i,j}(t_s)$. For example, in the above embodiment, since the computer 20 controls the pixels 14 to switch between seven different gray levels, N is equal to 42.

Figure 4:
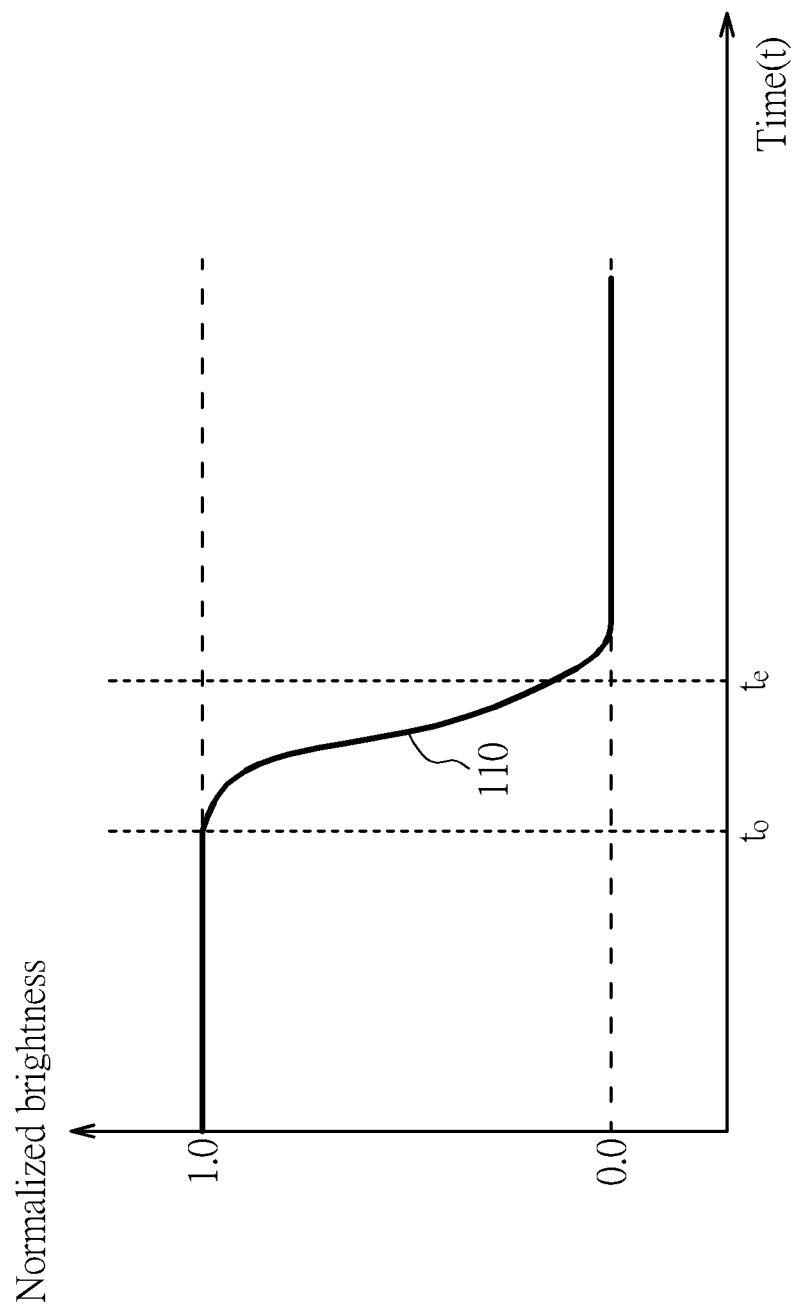
FIG. 4 shows another GLRT normalized curve of the LCD in FIG. 1.
Figure 5:
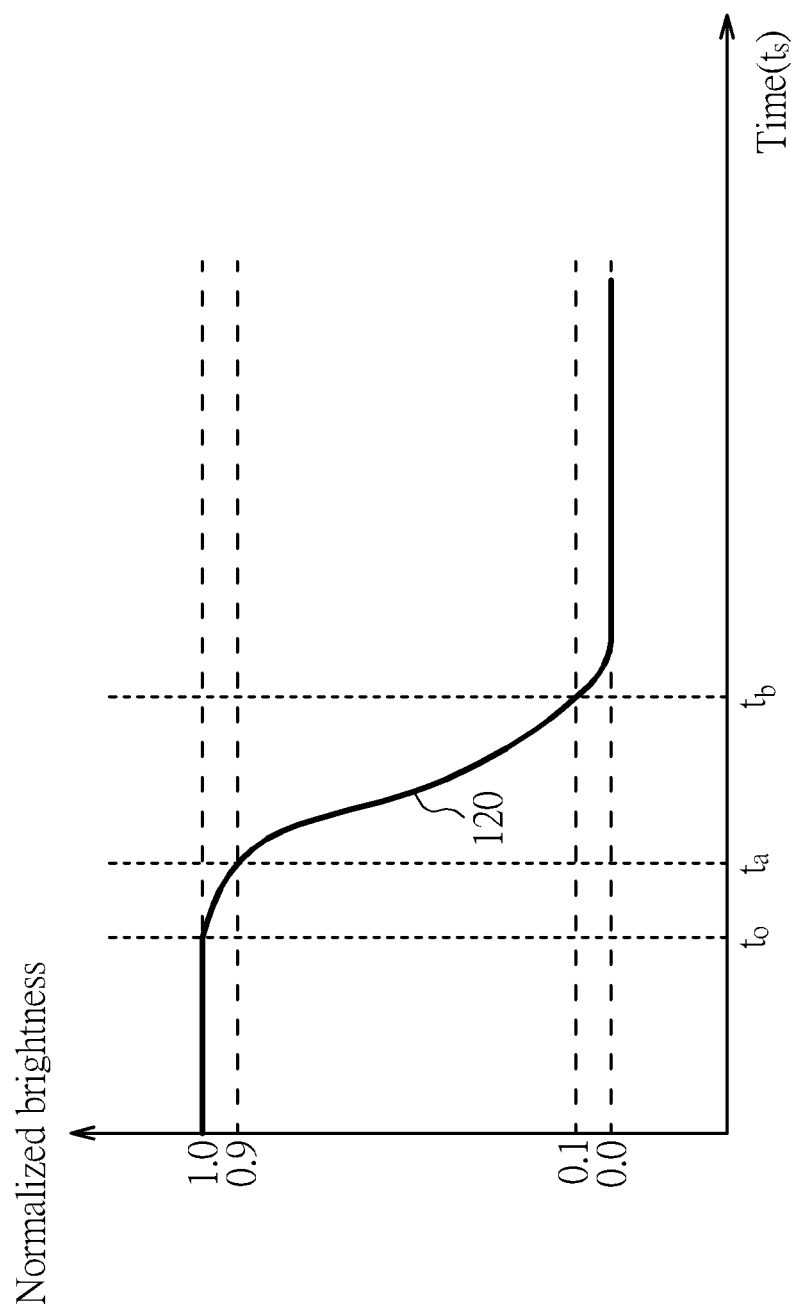
FIG. 5 shows an MPRT normalized curve obtained by integrating the GLRT normalized curve in FIG. 4.

FIGS. 2 and 3 are used to illustrate the corresponding GLRT normalized curve and corresponding MPRT normalized curve when gray level i is less than j. Conversely, when gray level i is greater than j, the corresponding GLRT normalized curve and MPRT normalized curve could be represented in FIG. 4 and FIG. 5, respectively. FIG. 4 shows another GLRT normalized curve 110 of the LCD 10 in FIG. 1, and FIG. 5 shows the MPRT normalized curve 120 obtained by integrating the GLRT normalized curve 110 in FIG. 4. In the embodiment of FIGS. 4 and 5, since the gray level i is greater than j, the brightness of the display panel 12 after switching the gray level would be less than the brightness before switching the gray level. Therefore, the normalized brightness of the display panel 12 before switching the gray level (i.e., when the gray level is equal to i) will be equal to 1, and the normalized brightness of the display panel 12 after switching the gray level value is equal to j) will be equal to 0. In addition, $M_{i,j}(t_a)$ is equal to 0.9, and $M_{i,j}(t_b)$ is equal to 0.1.

Figure 6:
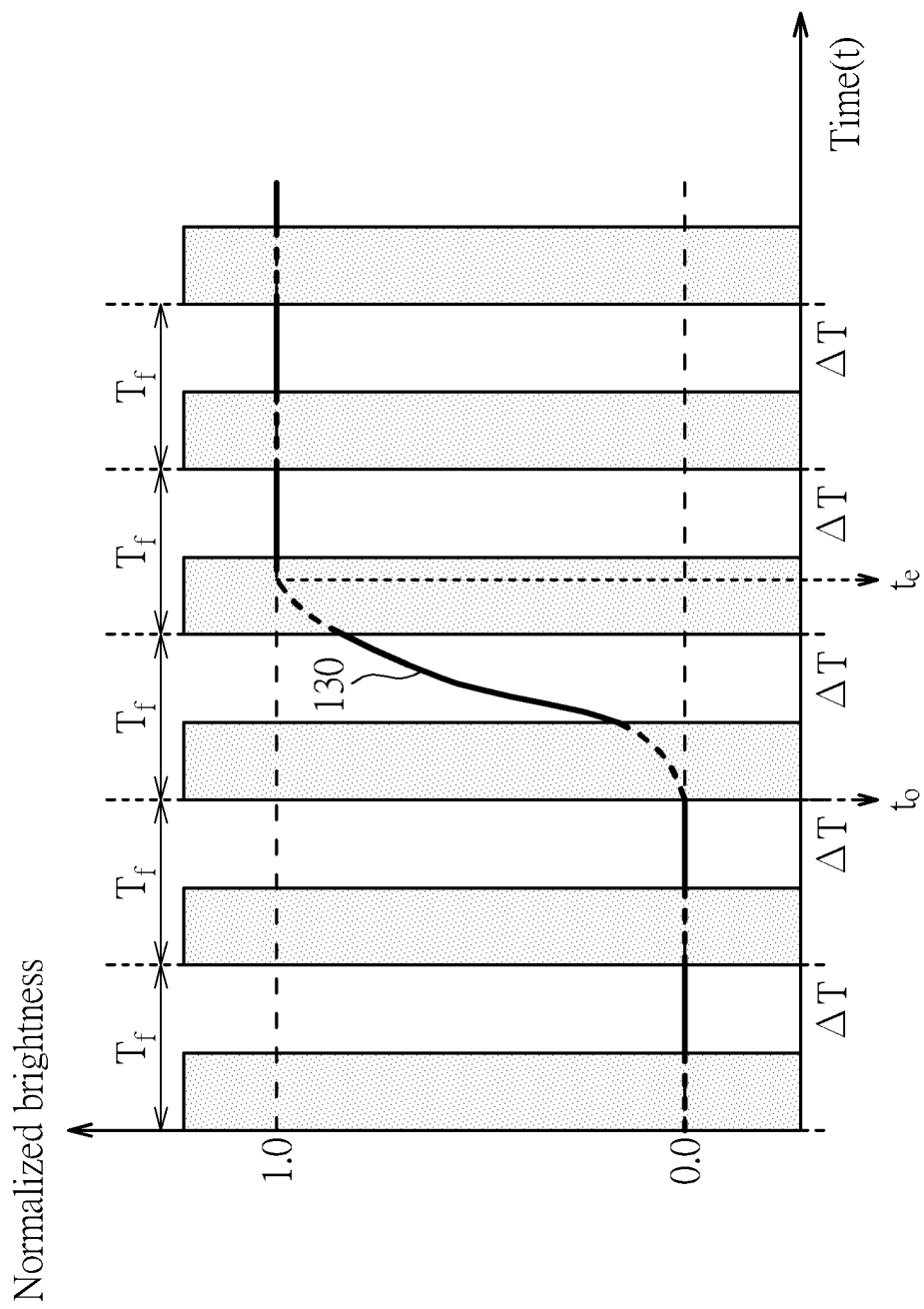
FIG. 6 shows one of the GLRT normalized curves of the LCD in FIG. 1 when the LCD is controlled to display a black screen.

In another embodiment of the present invention, in order to reduce the MPRT $T_M$, the control circuit 16 will timely turn off a backlight module that is used to illuminate the pixels 14 of the LCD 10 (that is, the control circuit 16 will dynamically adjust the backlight module), so that the display panel 12 would display a black screen for a predetermined period. In the embodiment, the MPRT under different backlight conditions could be simulated by changing the time to turn on the backlight of the LCD 10. Taking FIG. 6 as an example, the areas marked with dots in FIG. 6 are corresponding to the time when the backlight module of LCD 10 is turned off, and the areas not marked by dots are corresponding to the time the backlight module of the LCD 10 is turned on. $T_f$ is the frame period of the LCD 10, and $\Delta T$ is the time period when the backlight module is turned on, $t_o$ represents the time point at which the pixels 14 start to switch the gray level, and $t_o$ represents the time point at which the pixels 14 stop switching the gray level. In this embodiment, if the GLRT normalized curve 130 is represented by $G'_{i,j}(t)$, and the MPRT normalized curve 140 is represented by $M'_{i,j}(t_s)$, then $G'_{i,j}(t)$ could be expressed by the following equation (4), and the MPRT normalized curve $M'_{i,j}(t_s)$ could be expressed by the following equation (5):

$$G'_{i,j}(t) = \begin{cases} G_{i,j}(t), & \text{when } (nT_f - \Delta T) < t < nT_f \\ 0, & \text{when } t \text{ is not between } (nT_f - \Delta T) \text{ and } nT_f \end{cases} \tag{4}$$

$$M'_{i,j}(t_s) = \int_{t_s}^{t_s+T_f} G'_{i,j}(t)dt \tag{5}$$

Where, n is a positive integer.

Figure 7:
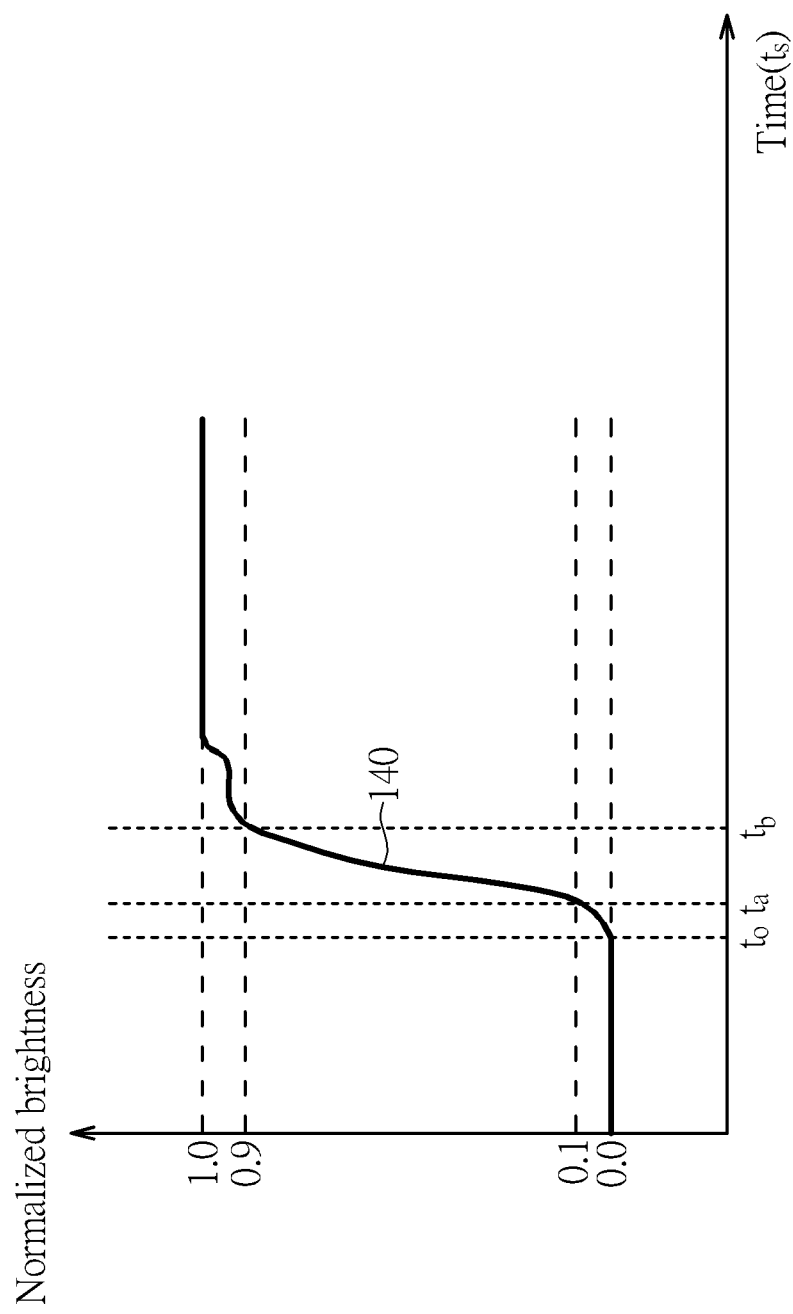
FIG. 7 shows an MPRT normalized curve obtained by integrating the GLRT normalized curve in FIG. 6.

It can be seen from the comparison between FIG. 3 and FIG. 7, the time interval $(t_b-t_a)$ in FIG. 7 will be less than the time interval $(t_b-t_a)$ in FIG. 3. Therefore, by briefly turning off the backlight module to make the display panel 12 display a black screen, the time interval $(t_b-t_a)$ would be reduced. According to the equations (2) and (3), when the time interval $(t_b-t_a)$ is reduced, the MPRT $T_M$ of the LCD 10 would be reduced accordingly.

Figure 8:
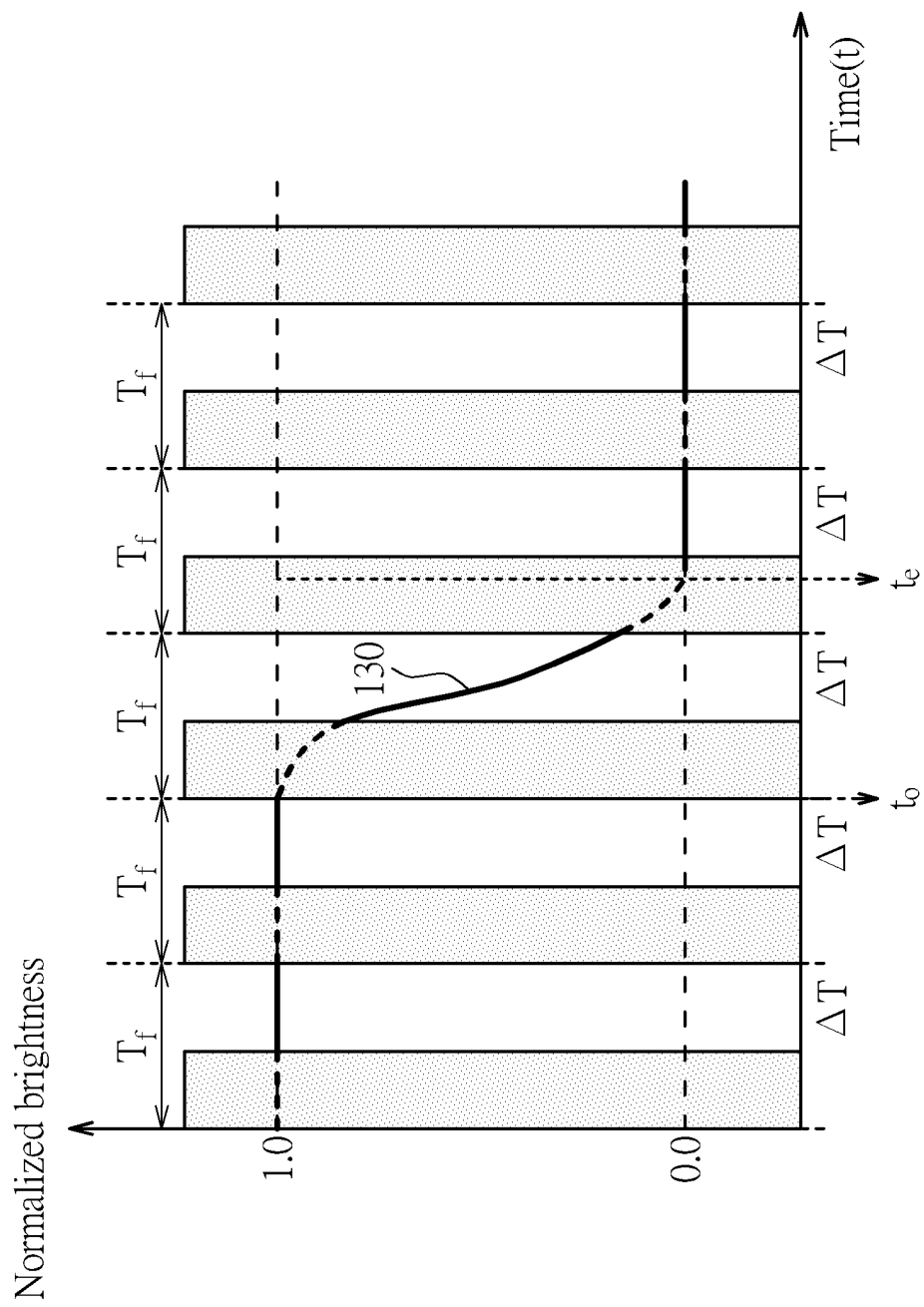
FIG. 8 shows another GLRT normalized curve of the LCD in FIG. 1 when the LCD is controlled to display a black screen.
Figure 9:
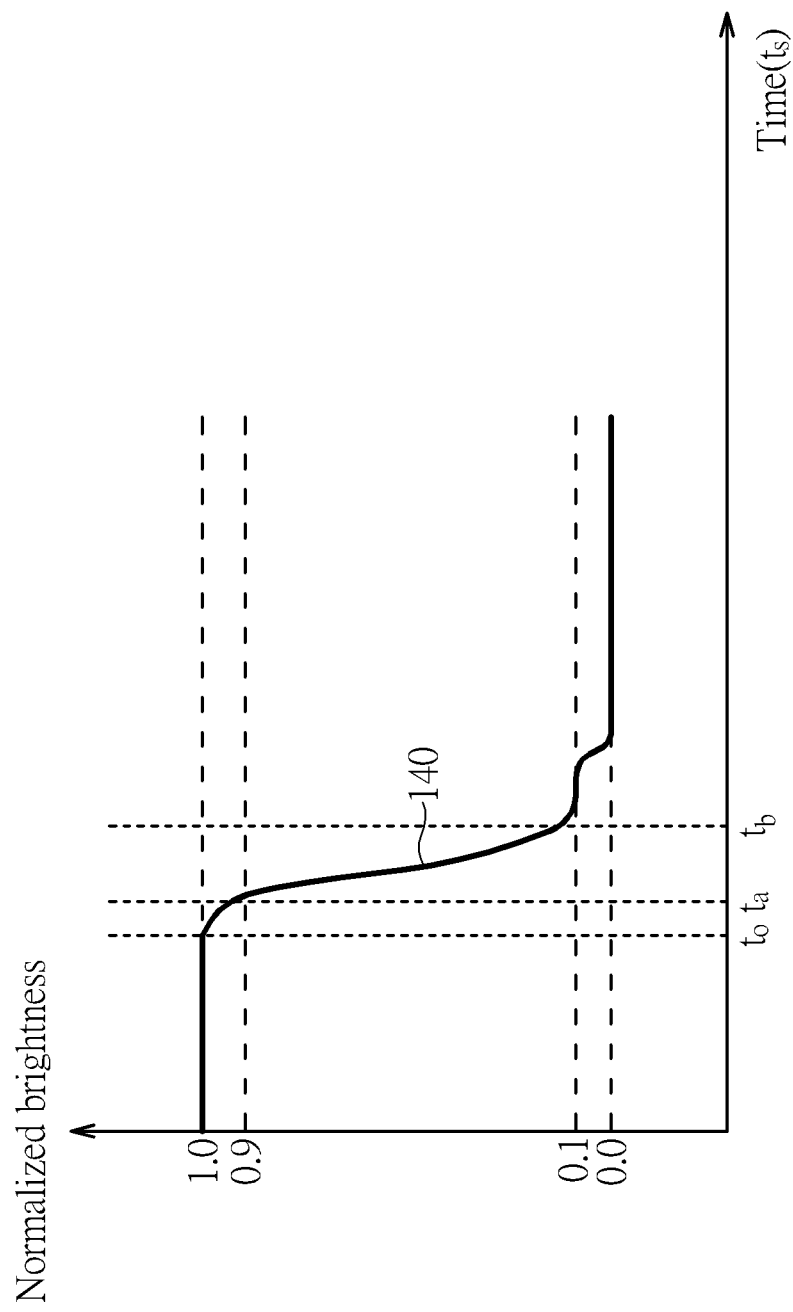
FIG. 9 shows an MPRT normalized curve obtained by integrating the GLRT normalized curve in FIG. 8.

FIGS. 6 and 7 are used to illustrate the corresponding GLRT normalized curve and the MPRT normalized curve respectively when the gray level i is less than j and the display panel 12 is controlled to display a black screen. Conversely, when the gray level i is greater than j and the display panel 12 is controlled to display a black screen, the corresponding GLRT normalized curve and the MPRT normalized curve could be represented in FIGS. 8 and 9, respectively. In the embodiment of FIGS. 8 and 9, since the gray level i is greater than j, the brightness of the display panel 12 after switching the gray level will be less than the brightness before switching the gray level, as shown in FIG. 8. Therefore, the normalized brightness of the display panel 12 before switching the gray level (i.e., when the gray level is equal to i) will be equal to 1, and the normalized brightness of the display panel 12 after switching the gray level (i.e., when the gray level is equal to j) would be equal to 0. In addition, $M'_{i,j}(t_a)$ is equal to 0.9, while $M'_{i,j}(t_a)$ is equal to 0.1.

Figure 10:
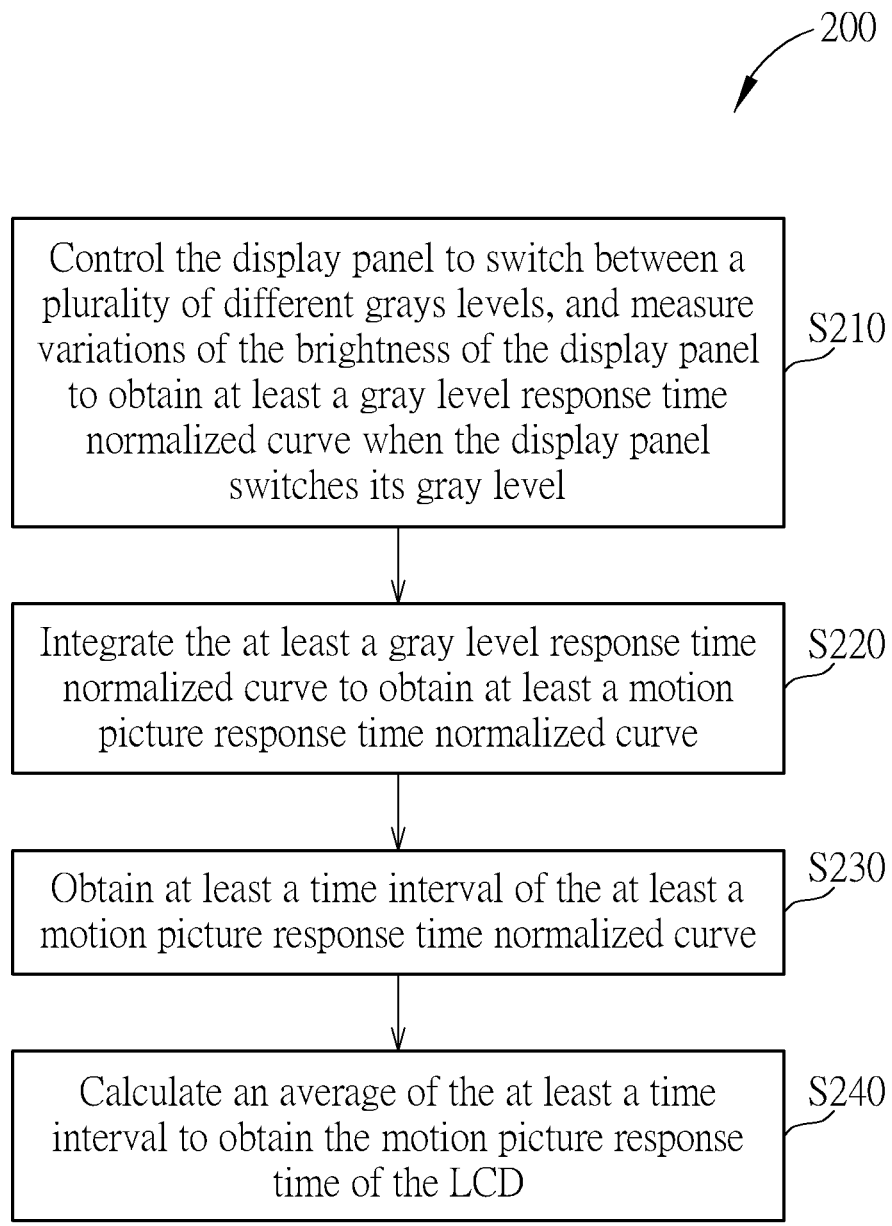
FIG. 10 is a flowchart of a method for measuring the MPRT of the LCD in FIG. 1 according to an embodiment of the present invention.

FIG. 10 is a flowchart of a method 200 for measuring the MPRT of the LCD 10 in FIG. 1 according to an embodiment of the present invention. The method 200 comprises the following steps:

Step S210: Controlling the display panel 12 to switch between a plurality of different grays levels, and measuring variations of the brightness of the display panel 12 to obtain at least a GLRT normalized curve $G_{i,j}(t)$ when the display panel 12 switches its gray level;

Step S220: Integrating the at least a gray level response time normalized curve $G_{i,j}(t)$ to obtain at least a motion picture response time normalized curve $M_{i,j}(t_s)$;

Step S230: Obtaining the at least a time interval $T_1$ of the at least an MPRT normalized curve $M_{i,j}(t_s)$; and Step S240: Calculating the average of the at least a time interval $T_{i,j}$ to obtain the MPRT $T_M$ of the LCD 10.

Compared with the prior art, the present invention obtains the motion picture response time (MPRT) of the LCD by measuring the gray level response time (GLRT) of the LCD. Since the GLRT of the LCD could be measured through components such as a photosensitive element and an analog-to-digital converter, there is no need for more expensive equipment in the prior art, such as a mobile camera. Therefore, according to the present invention, the MPRT of the LCD could be obtained without using a complicated measurement device. It significantly improves the reliability of the obtained MPRT and convenience of measuring the MPRT.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for measuring a motion picture response time (MPRT) of a liquid crystal display (LCD), the method comprising:
   controlling a display panel of the LCD to switch between a plurality of different gray levels;
   measuring variations of brightness of the display panel while switching the display panel between the gray levels to obtain a plurality of gray level response time (GLRT) normalized curves;
   integrating the plurality of GLRT normalized curves to obtain at least an MPRT normalized curve;
   obtaining at least a time interval of the at least an MPRT normalized curve; and
   calculating an average of the at least a time interval to obtain the MPRT of the LCD;
   wherein each GLRT normalized curve is represented by $G_{i,j}(t)$ to indicate a relationship between a brightness of the display panel and time while switching a gray level of each pixel of the display panel from i to j, where t represents time, and i is not equal to j; and
   wherein an MPRT normalized curve obtained by integrating the GLRT normalized curve $G_{i,j}(t)$ is $M_{i,j}(t_s)$, and $M_{i,j}(t_s) = \int_{t_s}^{t_s+T_f} G_{i,j}(t)dt$, where $t_s$ is time, and $T_f$ is a frame period of the LCD.

2. The method of claim 1, wherein i and j are selected from a group consisting of seven gray levels.

3. The method of claim 2, wherein the seven gray levels are 0, 60, 90, 120, 160, 200, and 255.

4. The method of claim 1, wherein a combination of i and j of each GLRT normalized curve is different from combinations of i and j of other GLRT normalized curves.

5. The method of claim 1, wherein a time interval of the MPRT normalized curve $M_{i,j}(t_s)$ is equal to $(t_b - t_a)$, $t_a$ and $t_b$ are two different times points, and $M_{i,j}(t_a)$ and $M_{i,j}(t_b)$ are between 0 and 1.

6. The method of claim 5, wherein when i is less than j, $M_{i,j}(t_a)$ is less than $M_{i,j}(t_b)$; and
   when i is greater than j, $M_{i,j}(t_a)$ is greater than $M_{i,j}(t_b)$.

7. The method of claim 6, wherein when i is less than j, $M_{i,j}(t_a)$ is equal to 0.1 and $M_{i,j}(t_b)$ is equal to 0.9; and
   wherein when i is greater than j, $M_{i,j}(t_a)$ is equal to 0.9 and $M_{i,j}(t_b)$ is equal to 0.1.

8. The method of claim 1 further comprising:
   turning off a backlight module of the LCD for at least a predetermined period while switching the display panel between the gray levels.

9. A measurement system for measuring a motion picture response time (MPRT) of a liquid crystal display (LCD), the measurement system comprising:
   a computer configured to control a display panel of the LCD to switch between a plurality of different gray levels; and
   a measurement device configured to measure variations of brightness of the display panel when the display panel is switched between the gray levels;
   wherein the measurement device transmits results of measuring the variations of the brightness of the display panel to the computer, and the computer is further configured to obtain a plurality of gray level response time (GLRT) normalized curves according to the results;
   wherein the computer is further configured to integrate the plurality of GLRT normalized curves to obtain at least an MPRT normalized curve;
   wherein the computer is further configured to obtain at least a time interval of the at least an MPRT normalized curve; and
   wherein the computer is further configured to calculate an average of the at least a time interval to obtain the MPRT of the LCD;
   wherein each GLRT normalized curve is represented by $G_{i,j}(t)$ to indicate a relationship between the brightness of the display panel and time while switching a gray level of each pixel of the display panel from i to j, where t represents time, and i is not equal to j; and
   wherein an MPRT normalized curve obtained by integrating the GLRT normalized curve $G_{i,j}(t)$ is $M_{i,j}(t_s)$, and $M_{i,j}(t_s) = \int_{t_s}^{t_s+T_f} G_{i,j}(t)dt$, where $t_s$ is time, and $T_f$ is a frame period of the LCD.

10. The measurement system of claim 9, wherein i and j are selected from a group consisting of seven gray levels.

11. The measurement system of claim 10, wherein the seven gray levels are 0, 60, 90, 120, 160, 200, and 255.

12. The measurement system of claim 9, wherein a combination of i and j of each GLRT normalized curve is different from combinations of i and j of other GLRT normalized curves.

13. The measurement system of claim 9, wherein a time interval of the MPRT normalized curve $M_{i,j}(t_s)$ is equal to $(t_b - t_a)$, $t_a$ and $t_b$ are two different times points, and $M_{i,j}(t_a)$ and $M_{i,j}(t_b)$ are between 0 and 1.

14. The measurement system of claim 13, wherein when i is less than j, $M_{i,j}(t_a)$ is less than $M_{i,j}(t_b)$; and
   when i is greater than j, $M_{i,j}(t_a)$ is greater than $M_{i,j}(t_b)$.

15. The measurement system of claim 14, wherein when i is less than j, $M_{i,j}(t_a)$ is equal to 0.1 and $M_{i,j}(t_b)$ is equal to 0.9; and
   wherein when i is greater than j, $M_{i,j}(t_a)$ is equal to 0.9 and $M_{i,j}(t_b)$ is equal to 0.1.

16. The measurement system of claim 9, wherein a backlight module of the LCD is turned off for at least a predetermined period while the computer controls the display panel of the LCD to switch between the gray levels.

* * * * *